US008943581B2

(12) United States Patent
Ferren

(10) Patent No.: US 8,943,581 B2
(45) Date of Patent: Jan. 27, 2015

(54) CONTROLLED ACCESS TO FUNCTIONALITY OF A WIRELESS DEVICE

(75) Inventor: Bran Ferren, Beverly Hills, CA (US)

(73) Assignee: Intel Corporation, Santa Clara, CA (US)

(*) Notice: Subject to any disclaimer, the term of this patent is extended or adjusted under 35 U.S.C. 154(b) by 194 days.

(21) Appl. No.: 13/539,916

(22) Filed: Jul. 2, 2012

(65) Prior Publication Data
US 2012/0272313 A1 Oct. 25, 2012

Related U.S. Application Data

(62) Division of application No. 13/376,630, filed as application No. PCT/US2010/037983 on Jun. 9, 2010.

(60) Provisional application No. 61/187,520, filed on Jun. 16, 2009.

(51) Int. Cl.
G06F 7/04 (2006.01)
G06F 3/02 (2006.01)
(Continued)

(52) U.S. Cl.
CPC .............. *G06F 3/02* (2013.01); *G02B 13/0065* (2013.01); *G02B 13/009* (2013.01); *G03B 3/00* (2013.01); *G06F 3/0418* (2013.01); *G06F 3/04842* (2013.01); *G06F 3/0488* (2013.01); *G06F 3/04883* (2013.01); *G06F 3/04886* (2013.01); *G06F 9/4443* (2013.01); *G06F 21/32* (2013.01); *G06K 7/10811* (2013.01); *G06K 2207/1011* (2013.01); *G06Q 30/02* (2013.01);
(Continued)

(58) Field of Classification Search
CPC ... H04L 63/08; H04L 63/0861; G06F 21/305; G06F 2221/2113; G06Q 20/40145; G06K 9/70; G06K 9/00; G07C 9/00; B42D 15/10; A61B 5/117; G06T 7/00
See application file for complete search history.

(56) References Cited

U.S. PATENT DOCUMENTS

2003/0004911 A1   1/2003   Wong
2004/0039909 A1*  2/2004   Cheng .......................... 713/169
(Continued)

FOREIGN PATENT DOCUMENTS

CN   1393823   1/2003
CN   1393826   1/2003
(Continued)

OTHER PUBLICATIONS

Written Opinion of Singapore Application No. 201108875-4 Mailed Sep. 20, 2013, 8 pages.
(Continued)

*Primary Examiner* — Shewaye Gelagay
(74) *Attorney, Agent, or Firm* — Blakely, Sokoloff, Taylor & Zafman LLP

(57) ABSTRACT

Various embodiments of the invention may be used to verify that a person being authorized by biometric techniques to use a device is a living person and not some form of recording intended to spoof the system. Some embodiments may try to cause a change in a measured biometric feature, and compare images taken before and after the change to verify the change occurred. In some embodiments, multiple stages of verification may be used, either to increase the difficulty of spoofing the security system, or to provide different levels of security for different levels of access to the device's functionality.

15 Claims, 5 Drawing Sheets

(51) Int. Cl.
*G02B 13/00* (2006.01)
*G03B 3/00* (2006.01)
*G06F 3/041* (2006.01)
*G06F 3/0484* (2013.01)
*G06F 3/0488* (2013.01)
*G06F 9/44* (2006.01)
*G06F 21/32* (2013.01)
*G06K 7/10* (2006.01)
*G06Q 30/02* (2012.01)
*H04N 5/232* (2006.01)
*H04N 13/02* (2006.01)
*G06F 3/023* (2006.01)
*H04M 1/725* (2006.01)

(52) U.S. Cl.
CPC .......... *H04N 5/232* (2013.01); *H04N 5/23296* (2013.01); *H04N 13/0239* (2013.01); *H04N 13/0242* (2013.01); *H04M 1/72563* (2013.01); *H04M 2250/52* (2013.01); *G06F 3/0416* (2013.01); *G06F 3/0237* (2013.01)
USPC .................................. 726/19; 76/17; 713/186

(56) References Cited

U.S. PATENT DOCUMENTS

2007/0300077 A1\* 12/2007 Mani et al. .................... 713/186
2009/0292927 A1\* 11/2009 Wenzel et al. ................ 713/185

FOREIGN PATENT DOCUMENTS

| | | |
|---|---|---|
| CN | 101256700 | 9/2008 |
| EP | 1898615 | 3/2008 |
| JP | 2000-033080 | 2/2000 |
| JP | 2003-033659 | 1/2003 |
| JP | 2003-237262 | 8/2003 |
| JP | 2006-252110 | 9/2006 |
| JP | 2007-336245 | 12/2007 |
| KR | 10-2005-0083515 | 8/2005 |
| KR | 10-2007-0062599 | 6/2007 |
| KR | 10-2005-0073849 | 7/2008 |
| WO | WO 2007/119818 | 10/2007 |

OTHER PUBLICATIONS

State Intellectual Property Office (SIPO) Of the People's Republic of China, Chinese Application No. 201110386787.6. Notification of the 2$^{nd}$ Office Action, Mailed Jul. 14, 2014.

\* cited by examiner

US 8,943,581 B2

CONTROLLED ACCESS TO FUNCTIONALITY OF A WIRELESS DEVICE

CROSS-REFERENCE TO RELATED APPLICATIONS

This is a divisional application of U.S. patent application Ser. No. 13/376,630, filed on Dec. 7, 2011, which claims priority to International application PCT/US2010/037983, filed on Jun. 9, 2010, which claims priority to U.S. Non-Provisional patent application No. 61/187,520, filed on Jun. 16, 2009, and priority is claimed thereof.

BACKGROUND

Small handheld electronic devices have become ubiquitous in society, and people are becoming more and more dependent on these devices to obtain information, communicate with others, provide entertainment, and perform financial transactions, among other things. The devices' small size makes them easy to lose and a target for thieves, while their increasing capabilities provide access to sensitive personal data and financial resources. Various security techniques have been developed to determine if a person trying to use such a device has been previously authorized to use the device. Biometric authentication is sometime proposed as a way to avoid passwords or artifacts (e.g., keys, badges, etc.), both of which can be stolen. But biometric identification can also be spoofed, by recording the authentic characteristic (a photograph of the face, an audio recording of the voice, a copy of a fingerprint, etc.) and using that recorded data to fool the biometric sensor.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
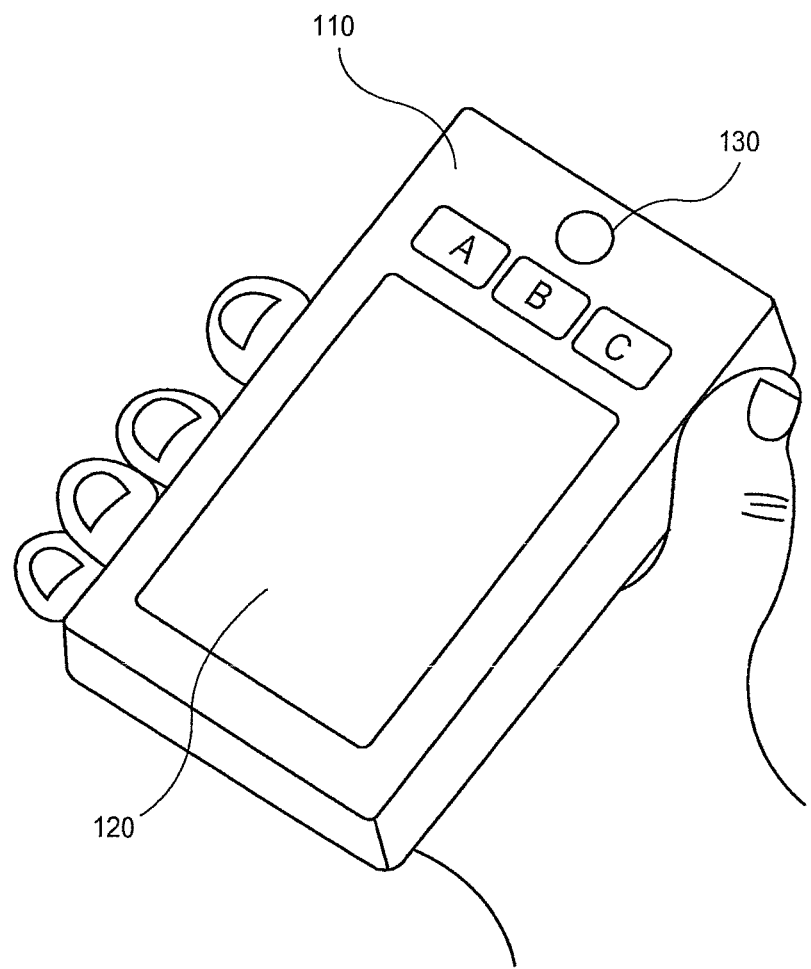
FIG. 1 shows a multi-function handheld device for wireless communications, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires. A wireless device may comprise at least one antenna, at least one radio, and at least one processor, where the radio transmits signals through the antenna that represent data and receives signals through the antenna that represent data, while the processor may process the data to be transmitted and the data that has been received. The processor may also process other data which is neither transmitted nor received.

Various embodiments of the invention may improve upon the use of biometric techniques intended to determine if a person attempting to use a device has been approved to do so. Such improved techniques may attempt to distinguish biometric measurements taken from a living person from those taken of a recording of a person. Within this document, the term "authorize", and its derivatives, will be used to indicate the process of determining whether a person attempting to use the system has been previously approved to use it, while the term "verify", and its derivatives, will be used to indicate the process of determining whether the received biometric inputs are coming from a living person rather than some type of recording. In most applications, both the authorization procedure and the verification procedure must be passed before the requested access will be granted. In some embodiments, multiple stages of authorization and/or verification may be used, either to increase the difficulty of spoofing the security system, or to provide different levels of security for different levels of access to the device's functionality.

Some techniques described herein involve using a camera to take a picture of a part of a person and analyzing some feature of the person in that picture. As used in this document, the term 'picture' may be either a still picture or moving pictures. In some cases, a single frame from moving pictures may be used as a still picture. In some embodiments, the picture is in the form of stored electronic data, and analyzing the picture includes analyzing that data. The term 'photograph', as used in this document, means a picture that has been recorded on a medium that may be presented in a manner that can be visually perceived by a human eye, whether on paper, with an electronic display, or through some other manner. Such photographs might be used to attempt to spoof the security system, and the techniques described herein may be used to thwart that attempt.

FIG. 1 shows a multi-function handheld user device for wireless communications, according to an embodiment of the invention. The illustrated device 110 is shown with various components, such as a touchscreen (a touch-sensitive display screen) 120 and buttons A, B, and C. Lens 130 is also shown which may be the externally visible portion of the device's camera. Other buttons, sensors, output devices, etc. may also be included but are not shown to avoid excessive clutter in the drawing. In various embodiments, the camera may take either still pictures or moving pictures, depending on the requirements.

Although the illustrated device 110 is depicted as having a particular shape, proportion, and appearance, with various elements located in particular locations, this is for example only and the embodiments of the invention may not be limited to this particular physical configuration. For example, in some embodiments the buttons may have different sizes and/or different shapes than shown, be located elsewhere on the same side or on different sides of the device, etc. In some embodiments the overall shape of the device 110 may be different than shown. Device 110 may also include functionality for wireless communication, for various visual, audio, and physical inputs, and for various visual, audio, and physical outputs. Device 110 may include a processor, a memory, a camera, a radio for wireless communications with other devices, and various other components, which may be used to accomplish the functionality described in this document.

Evidence that Biometric Readings are from a Living Person

Various techniques of biometric measurement have been developed to verify that a person attempting to use a system is actually approved to use the system. Regardless of the specific biometric parameter being used to authenticate a person, the sensing method used by a conventional security system is generally static, which can make it possible to spoof the system with a recorded parameter. Note: in this document, a biometric measurement is a measurement taken from a part of a person's physical body. This may include the detection of physical shape, motion, the light reflected from that part, and/or sound generated by that body.

To make such spoofing more difficult, various embodiments of the invention may initiate a change in a bodily feature, and capture an image of that feature before and after the change, thus preventing a simple static recording from being used to spoof the system. The change may be voluntary (e.g., getting the user to deliberately change facial expression), or may be involuntary (e.g., using light to change the size of the pupil of the person's eye).

In some instances, it might be possible to make two recordings, one for the initial reading and another for the subsequent reading, in an effort to defeat the system. Various embodiments may counteract such an attempt in ways that include, but are not limited to: 1) making the change unpredictable, so the subsequent reading cannot be anticipated, 2) making the initial reading unpredictable, so neither reading can be anticipated, 3) taking the readings close together in time, so that switching the recordings between readings is difficult or impractical.

Figure 2:
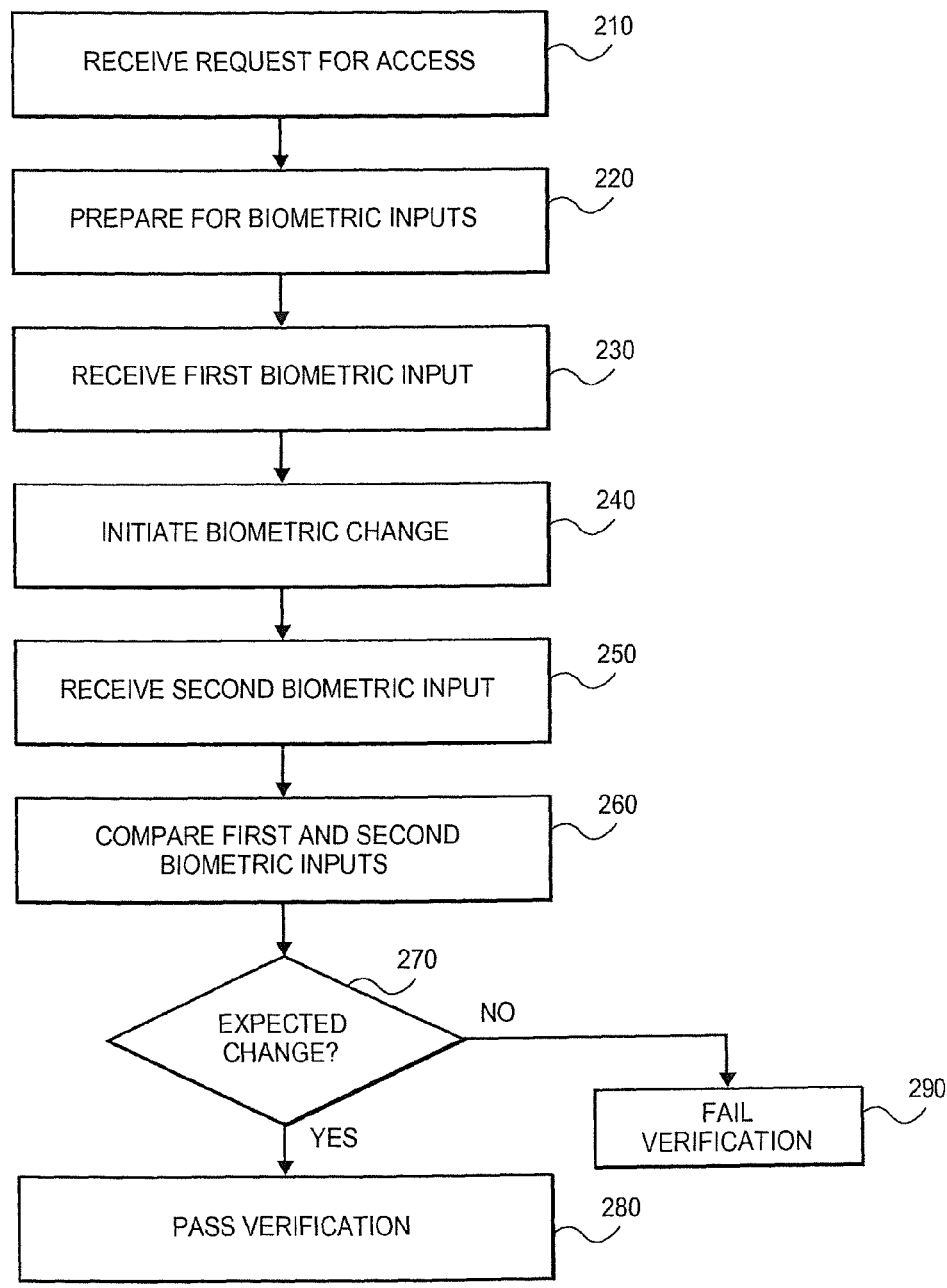
FIG. 2 shows a flow diagram of a method of verifying that biometric inputs are from a living person, according to an embodiment of the invention.

FIG. 2 shows a flow diagram of a method of verifying that biometric inputs are from a living person, according to an embodiment of the invention. The process described here is intended to verify that the inputs are coming from a living person rather than a recorded artifact, and is not specifically designed to verify the person is authorized to use the system. But in some embodiments, the same inputs may be used for both determining the person is authorized and verifying the inputs are from a living person. In other embodiments, the operations of authorizing and verifying may use none or only some of the same inputs.

At 210 an electronic device may receive a request for access to the device's functionality, or at least to a particular level of the device's functionality (different levels of functionality may require different levels of authorization, with correspondingly different processes for providing that authorization). This request may be directly initiated by the person requesting access (e.g., by pushing a button, touching a touchscreen, etc.), or may be automatically initiated in response to a triggering event (e.g., detecting motion of the device, seeing external movement through the device's camera, hearing a particular spoken phrase, etc.). As part of the authorization sequence for determining whether to grant such access, the device may prepare for receiving biometric inputs from the person at 220. This might include things such as, but not limited to, activating software for facial recognition, for pupil detection, for detecting hand movement, activating a source of illumination for the camera, etc.). At 230, the device may receive the first biometric input. This input may take any of several forms, such as a voice input, a fingerprint, or a picture of some part of the person's body. Specific examples of various parts of a person's body are described later.

After obtaining the first biometric input, at 240 the device may try to initiate a change in the person that can be detected from a second biometric input. In some embodiments, this may take the form of prompting the person to make that change (e.g, using an audio or video prompt to direct the user to perform some act). In other embodiments, the user may know from previous training which change to make. In still other embodiments, the device may cause an involuntary change in the user's biometric response.

After a sufficient time has passed for the change to occur, the device may receive a second biometric input at 250. This input may be triggered in various ways, such as but not limited to: 1) the user may manually trigger it, by pressing a button, speaking a voice command, etc., 2) the device may trigger it automatically a predetermined amount of time after the first input, 3) the device may monitor the person through the camera, interpreting the moving pictures or a series of still pictures, and select the picture(s) that indicate the user is trying to provide the desired response.

After analyzing both inputs, the results may be compared at 260 to determine at 270 whether the measured feature has changed in the desired manner. If it has not, the person has failed the verification procedure as indicated at 290. In some embodiments, a predetermined number of retries may be permitted, and the security procedure is not considered to be failed until the person fails all the retries or fails to attempt the permitted number retries within a certain period of time without passing. However, if the biometric feature has changed in the desired manner, either on the first attempt or on a permitted retry, the person has passed the verification procedure as indicated at 280. It should be noted that passing the verification procedure does not imply passing the authorization procedure, so access may still be denied if the authorization procedure is not passed.

In some embodiments, the test to verify whether the person is authorized and the test to determine whether the biometric inputs are coming from a living person may use the same inputs. For example, a picture of the person's face may be processed through facial recognition to determine if the person is authorized, and the same picture may be used to analyze the expression on the person's face. Similarly, a picture of the eye may be used to verify that eye has the characteristics of an authorized person's eye, and the same picture may be used to determine the size of the pupil. These and other possible embodiments are described later.

Eye Behavior Analysis to Prevent Security Spoofing

In recent years, biometric authentication techniques have been developed that verify the identity of a user by capturing an image of some feature of the intended user's eye (for example the pattern of the iris) and comparing it with a stored image of an authorized user's eye. However, this approach can be spoofed by obtaining a photograph of the authorized user's eye and presenting it to the camera. The techniques described here may avoid being fooled in that manner by sensing something that a photograph cannot provide. The techniques described here are intended only to prevent spoofing, and may be used in conjunction with another method of verifying the identity of the user.

In one embodiment, a camera on the device may take a flash picture of the user's eye, with the flash located close enough to the optical axis of the camera's lens to produce the phenomenon called 'red-eye', in which the eye's retina reflects light in the red and/or infrared range, making the pupil look red in the image. In a variation of a standard camera-based flash unit, the illuminator might be located along a concentric ring around the lens. Alternately, the illuminator could be located within the camera in such a position that the illumination projects out through the lens while the image being captured is coming in through the lens (e.g., the illuminator may be mounted on the imaging chip, or a beam-splitter could be used to cause the light from a separate internal light source to be directed outward along the optical axis of the lens). Regardless of the mechanics of the light source, however, red-eye does not happen when taking a flash picture of a photograph, because there is no real retina to create the red-eye effect. It is possible that the photograph was taken with a flash, and therefore shows a red spot where the pupil is, but the brightness of the red spot should not be as intense as the reflected red light from a real eye.

In some embodiments, the infrared component of the light reflected from the retina may be analyzed, provided the device is capable of measuring the intensity of infrared light. In some embodiments, an infrared illuminator may be projected to the face to facilitate this process, and the process may analyze the difference in intensity between infrared reflected from the pupil and infrared reflected from at least one other part of the face. Such an infrared illuminator may also be useful if verification is being performed under low-light conditions and/or the use of a bright, broad-spectrum flash is undesirable or unfeasible.

Alternatively, the device's camera may take two pictures, one without a flash to obtain a picture without red-eye, and another with the flash to obtain a picture with red-eye. A single photograph presented to the camera could not produce both results, and therefore could not be used to spoof the system in this manner. If the images are taken in rapid succession, it should not be possible for the user to present two successive photographs, one with and one without red-eye.

In another technique that involves capturing multiple images, the device may take two pictures separated by a period of time comparable to the dilatory response time of the human pupil. After taking the first picture of a person's eye, the device may cause the pupil of that eye to contract by directing a suitable amount of light towards that eye. This may be accomplished in various ways, such as but not limited to: 1) increasing steady-state illumination between pictures, 2) firing one or more flashes between pictures, 3) if the first picture is taken with a flash unit, that flash may be sufficient to cause the pupil to contract before taking the second picture, so additional light may not be necessary. In some embodiments, more than two pictures may be taken, to show the progressive contraction of the pupil over the dilatory response time. In some embodiments, the brightness of the device's display may be used to increase illumination, e.g. as in option 1, if the ambient light levels are low enough for that to sufficiently effect the size of the pupil.

After waiting long enough for the pupil to contract, the second picture may be captured. The device may then compare the two pictures to see if the pupil in the second picture is smaller that in the first picture. This comparison may be done in two ways. In the first, the size of the pupil may be measured directly, and a sufficient reduction in size indicates the pictures are of a real eye rather than a photograph. In the second, if a flash unit is used to take both pictures, the amount of red and/or infrared light reflected through the pupil from the eye's retina may be compared for both pictures. If the second picture shows a sufficiently reduced amount of reflected light, that may indicate the pupil is smaller and that the pictures are of a real eye rather than a photograph of an eye.

In still another embodiment, a video camera may be used to detect blinking of the eyelid, implying the presence of a living person. This may be handled in any of several ways, such as but not limited to: 1) use video to confirm the person blinks at least once during a predetermined period of time, 2) measure the blink rate to confirm it is consistent with the blink rate of a living person, 3) use a high-speed photodetector to measure the rise and/or fall time of the eyelid during a blink to confirm that it is consistent with that of a living person, 4) use a high-speed photodetector to measure a mismatch between the timing or rise/fall time of the left and right eyelids (blinking is seldom completely synchronized between the two eyes), 5) etc. In still another technique, a detector may be used to detect saccades, i.e., rapid movement of the eye as the eye moves from point to point in the field of view.

Although described as separate techniques, any of these may be used in combination with each other, or with other techniques not described here. Most of these may be used either on one eye, or on both eyes for additional verification. In some embodiments the device's general-purpose camera may be use to capture the images, while in other embodiments, additional equipment may be used either by itself or in conjunction with the camera. In some embodiments, a filter may be used with the camera to emphasize particular wavelengths of light (e.g., red and/or infrared).

Figure 3:
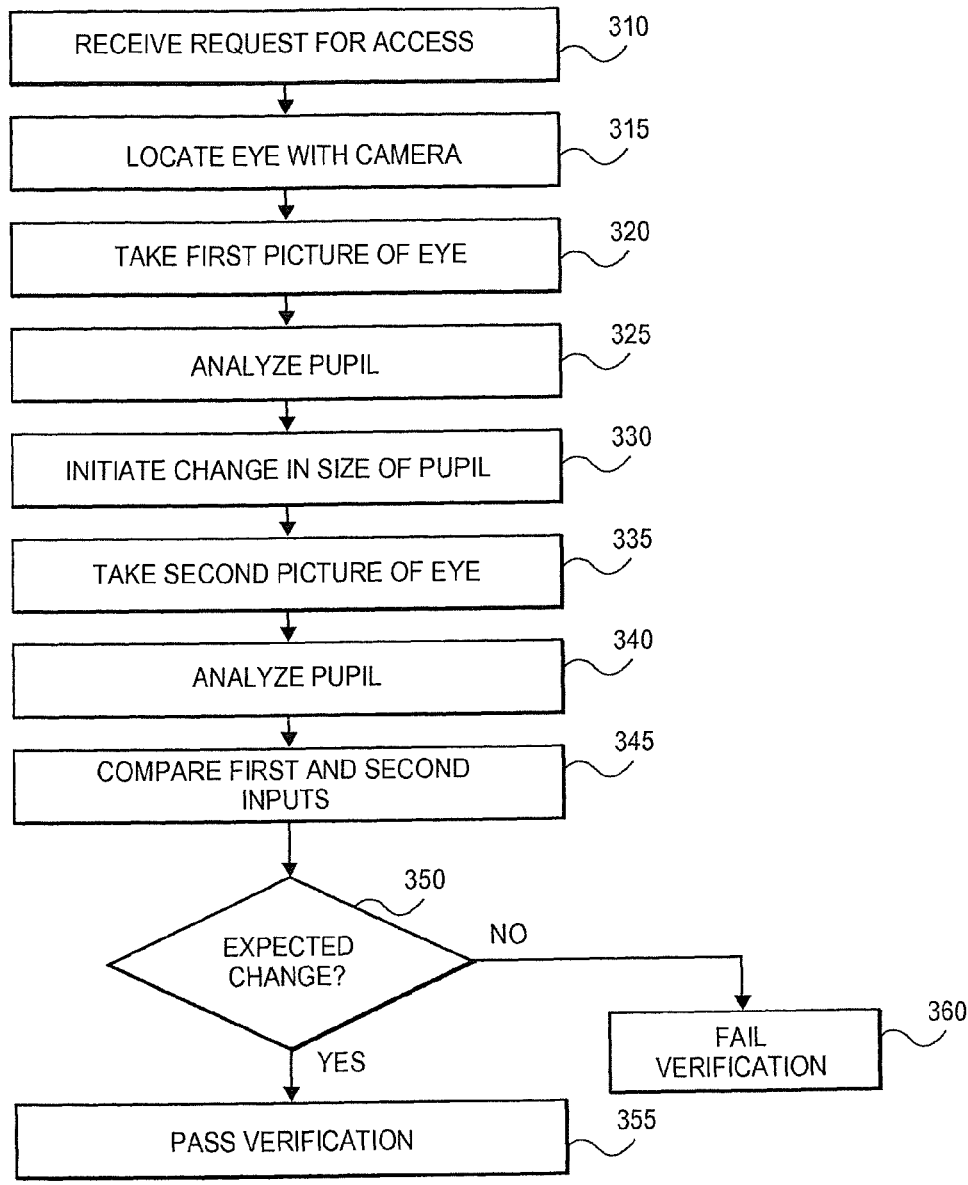
FIG. 3 shows a flow diagram of a method of verifying that biometric inputs from the eye of a living person, according to an embodiment of the invention.

FIG. 3 shows a flow diagram of a method of verifying that biometric inputs from the eye of a living person, according to an embodiment of the invention. At 310 an electronic device may receive a request for access to the device's functionality, or at least to a particular level of the device's functionality. As previously described for FIG. 2, this request may be initiated in various ways.

Since this process involves a visual analysis of the eye, the eye needs to be within the camera's field of view before a meaningful input may be obtained. At 315 the eye may be located within the camera's field of view. In some embodiments, the person simply points the camera towards their own face, while in other embodiments, one or more images from the device's camera may be analyzed to make sure the eye is in the image. At 320 the device may take a first picture of the eye, and the pupil may be analyzed at 325. Depending on the particular process being used, this analysis make take one of several different forms. In one, the absence or presence of the red-eye effect may be noted, while in another the size of the pupil may be calculated. In a simple one-image process that only looks for the presence of red-eye, this process may skip to 350 to determine if the red-eye effect was present. However, most such processes will take at least two pictures.

At 330, the device may initiate a change in the size of the pupil, such as but not limited to using light to cause the pupil to contract. A second picture may then be taken at 335, and the pupil again analyzed at 340. In some embodiments, the location of the eye in the image may again be determined before taking the second picture. Although this flow diagram shows analysis of the first picture being performed before taking the second picture, in some embodiments both pictures may be taken before analyzing either one. At 345 the two pictures may be compared to determine if the pupil changed in the expected manner. If it did not, the verification procedure may fail as indicated at 360, either immediately or after a predetermined number of retries. If the pupil did change as expected, the verification procedure may pass as indicated at 355.

Physical Body Behavior to Prevent Security Spoofing

Facial recognition technology has been developed in which the captured image of a face may be compared with a database of faces to identify who the person is. But as before, these systems may sometimes be fooled by placing a picture of the authorized person in front of the camera. However, this shortcoming may be overcome by prompting the user to change facial expressions, and verifying the pictures of the face changed in the requested manner. Such prompting may be presented in any feasible form, such as but not limited to a verbal command, text directions on the touchscreen, a graphics image of the desired expression, etc.

In some embodiments, after taking a first picture of the face, the user may be prompted to change expressions, and a second picture may be taken and compared with the first picture. In a simple version of this technique, the comparison may only verify that the expression changed. In a more complex version, the user may be prompted to present a particular second expression (e.g., smile, frown, open mouth, close eyes, wink, look in a particular direction, etc.) and analysis may confirm that the second expression is the requested expression. In another version, both the first and second expressions may be prompted, and both may be analyzed to verify they are the correct expressions. In still another version, other physical bodily movements may be prompted, such as a particular hand gesture, rotating the head to the left or right, etc.

These specific actions are just examples of a larger group of actions termed physical body behavior, in which the person is prompted to perform an action with a particular part of the body, with multiple parts of the body, or with the whole body. The action may be to place a body part in a particular configuration which can be captured in a still picture (e.g., a particular expression on the face, or holding up a specified number of fingers on one hand), or the action may be to move the body in a particular way that can be captured in moving pictures (e.g., moving the left hand up and down, or rotating the head from left to right, etc.). Some embodiments may also prompt the user to interact with the user's surroundings in some manner, so that a change in the way those surroundings are sensed may be part of the comparison.

Figure 4:
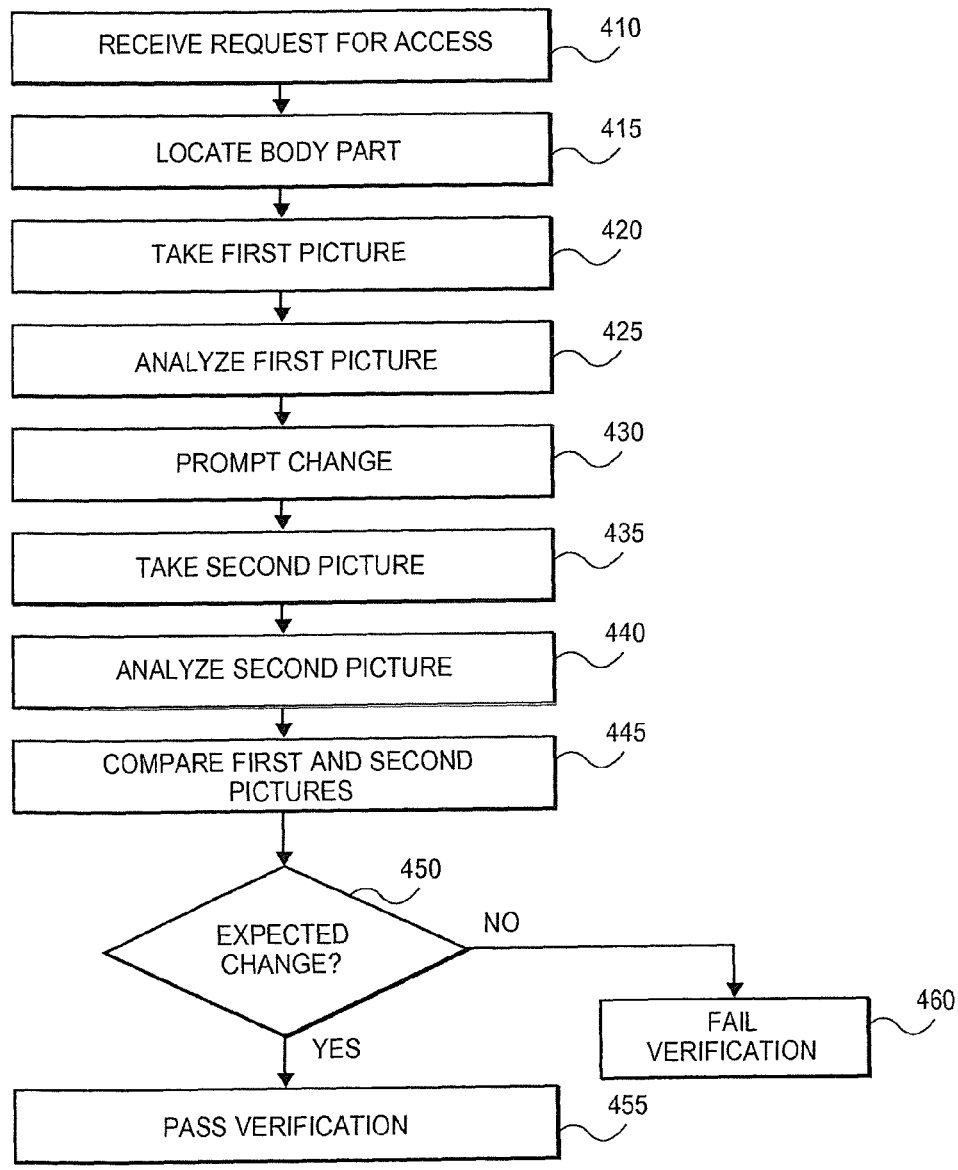
FIG. 4 shows a flow diagram of a method of verifying that biometric inputs are from a living person, according to an embodiment of the invention.

FIG. 4 shows a flow diagram of a method of verifying that biometric inputs are from a living person, according to an embodiment of the invention. At 410 an electronic device may receive a request for access to the device's functionality, or at least to a particular level of the device's functionality. As previously described for FIG. 2, this request may be initiated in various ways.

Since this process involves a visual analysis of a particular body part (face, hand, etc.), that body part needs to be within the camera's field of view before a meaningful input may be obtained. At 415 the body part may be located within the camera's field of view. In some embodiments, the person simply points the camera towards the indicated body part, while in other embodiments, one or more images from the device's camera may be analyzed to make sure the body part is in the image. At 420 the device may take a first picture of the body part, and the picture may be analyzed at 425. Depending on the particular process being used, this analysis may take one of several different forms. If a still image is sufficient, the contents of a single frame may be analyzed. But if system expects to see and analyze motion, the 'picture' in this process may consist of a series of frames that constitute a moving picture, and a frame-by-frame analysis may be performed to see if the expected motion is present.

If a one-time instance of the expected physical body behavior is all that is looked for, this process may skip to 450 to determine if the expected behavior was present in the first picture(s). But if before-and-after results are to be compared, then the device may prompt the person to change the visible position of the body part in some manner at 430, and take a second picture at 435. The second picture may be analyzed at 440. Although this flow diagram shows analysis of the first picture being performed before taking the second picture, in some embodiments both pictures may be taken before analyzing either one. At 445 the two pictures may be compared to determine if the body part displayed the expected change. If it did not, the verification procedure has failed as indicated at 460, either immediately or after a predetermined number of retries. But if the body part displayed the expected change, the verification procedure has passed, as indicated at 455.

Multi-Stage Authentication

In some applications, the level of security needed to authorize the user may depend on the data to be accessed and/or the operations to be performed. In general, more robust security measures require greater compute power and/or more time to verify the user is authorized. But most conventional security access processes are fixed, regardless of the level of security required for that particular access. This can require the device to expend more power, and the user to expend more time, than should be required for the level of security needed.

In some embodiments, a multi-level security access process may be used. A fairly simple and fast process may grant the user access to one level of functionality, where functionality includes access to particular data and/or operations. A second process, requiring more computationally intense analysis, may grant the user access to a higher level of functionality. This may be extended to include even more processes for even more levels of access, with each process being appropriate for the level of functionality needed. In some embodiments, the more demanding security analyses may be performed external to the device, by transmitting the inputs through the device's radio to another device (e.g., a server, the 'cloud', etc.) for processing.

In some embodiments, the user may be required to pass one level of security before being given a chance to pass the next higher level of security. This multi-stage process may provide excellent overall security because multiple techniques may be involved. It's also flexible, as different combinations of analysis may be used to accommodate different situations and/or users.

But in another embodiment, the user may request a particular level of access, and will be presented with only the security access process that is appropriate for that level. Once granted, the user may be permitted access to all levels of functionality up to and including that level, but not to higher levels.

In practice, this may work in several ways. As an example, entering a simple PIN on the device's keyboard may allow the user a first level of access. If the user fails that procedure, no levels of access may be permitted. But if the user passes, a more robust access method, such as a somewhat detailed biometric analysis, may grant the user a higher level of access. If the user fails the second process, access to that second level may be denied. If the user passes the second level process, he may be granted access to the second level of functionality, and may have the opportunity to gain even higher levels of access, with even more robust access processes. Of course, each access process may permit a certain number of retries to accommodate simple user error and/or the tolerances of the measurement system.

In some embodiments, failing the access process will deny the user entry to the next level, but will permit the user to continue at the present level. In other embodiments, failing the access process will deny access to the next level, but will also terminate access to the current level, and may terminate access to even lower levels.

Multiple levels of access may be used to control access to many different functions. One example, which is only an example and should not be taken as a limitation, would be these five progressive levels of access: 1) keep phone unlocked, 2) unlock phone, 3) access email, 4) conduct financial transactions of less than a particular amount, 5) conduct financial transactions of more than the particular amount.

Although sometimes described as 'higher' levels of access, in some embodiments various levels of access are simply different, without implying that one level is more important or comprehensive than another. For example, two sections of data may be equally important and restricted, but access to each one may require a different access process that shows the user has previously obtained permission to access that data.

Figure 5:
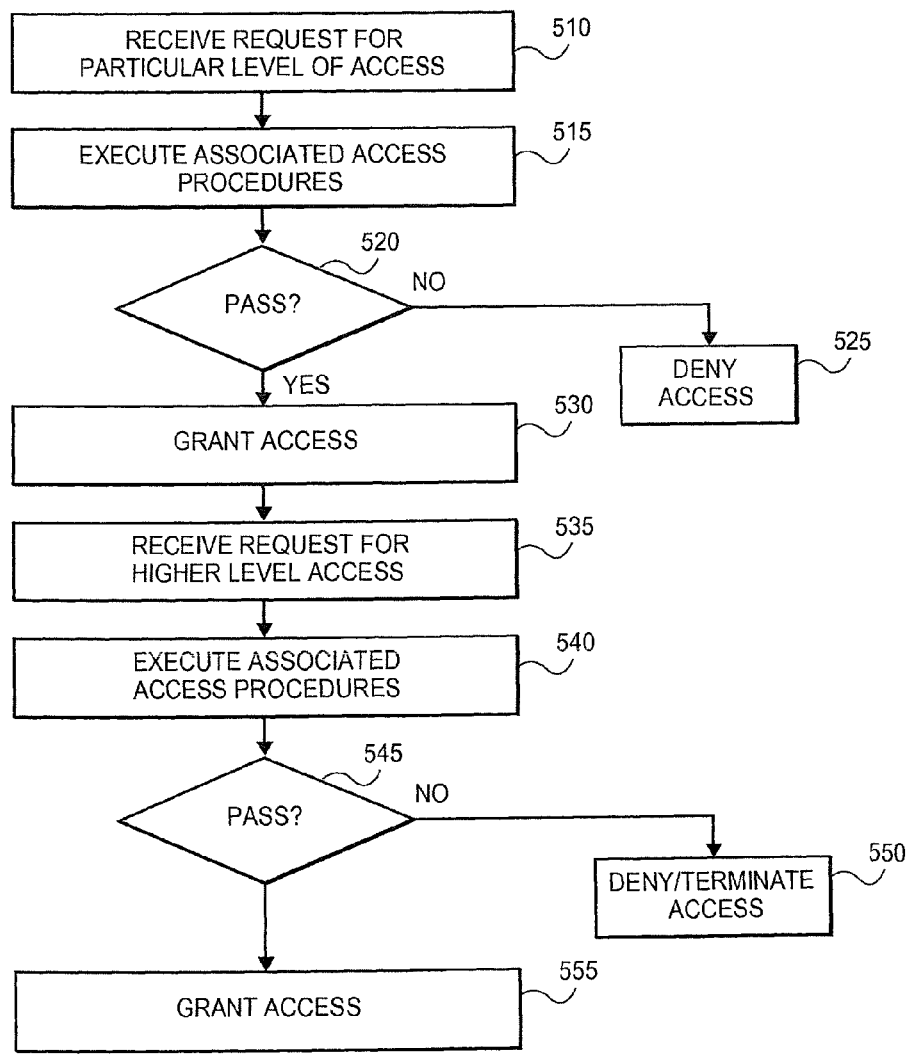
FIG. 5 shows a flow chart of a method of granting multiple levels of restricted access to a device, according to an embodiment of the invention.

FIG. 5 shows a flow chart of a method of granting multiple levels of restricted access to a device, according to an embodiment of the invention. At 510, a device may receive a request for a particular level of access to the device's functionality. This request may be triggered in any of several ways, such as but not limited to: 1) a person presses one or more buttons on the device, 2) the device senses movement, 3) the device's power is turned on, 4) etc. In some embodiments, first-level access may permit only very basic functionality, without access to any restricted, confidential, or personal information. In some embodiments, this level of access may permit just enough functionality to request a higher level of access.

Upon receipt of the request, at 515 the device may execute the procedures designed to determine if the intended user is authorized for such access. If the authorization procedure fails, as determined at 520, access may be denied at 525. But if the authorization procedure passes, the requested access may be granted at 530, and the device may perform whatever functions are permitted at that level. If a request for higher-level access is received at 535, at 540 the device may execute the higher-level access procedures designed to determine if the intended user is authorized for such access. If the procedure fails, the requested access may be denied at 550, and in some embodiments the current level of access may be terminated. But if the procedure passes, the higher-level access may be granted at 555. This process may continue for even higher levels of access, if such levels exist for the device. Although the described procedures are for authorization, in some embodiments, some or all of the authorization procedures may be accompanied by an associated verification procedure. In such cases, the requested access may be denied if either the authorization or verification procedure fails.

In some embodiments, the specific actions needed for authorization may be predetermined and programmed into the device. In other embodiments, the actions may be variable but determined within the device. In still other embodiments, the actions may be specified by a source external to the device. For example, to grant the user authorization to perform a large financial transaction, a person or computer at the other end of the communication might specify the actions the user needs to perform to be authorized.

Usage Methods

The aforementioned techniques may be used for various purposes. One such purpose is to permit a user access to a handheld electronic device. Such a device may include a keypad for entering a PIN or other access code, and may also include a camera for capturing an image of the user's eye, face, hand, etc. The techniques may be used for initial access, and/or may be used to regain access after access has been lost (e.g., if the device goes into a non-operational low-power mode after a period of non-use). These techniques may also be used for other purposes, such as to gain access to a larger computer, a network, a building, a room, an area, etc. In some embodiments, if the person does not pass a specific technique, or if the readings are ambiguous, a different technique may be used. Similarly, different verification techniques may be used for access to different sets of predetermined features, regardless of whether access to those features are considered to require different levels of security.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus comprising:
an electronic device comprising a processor, a memory, and a camera, the device to determine whether a person attempting to use the device is authorized to use the device, wherein the device is to:
receive a first input of a first type;
perform a first analysis of the first input to determine if the person attempting to use the device is authorized to use the a first level of functionality in the device based on the first analysis;

receive a second input of a second type different than the first type, wherein the second input is initiated via at least one of manual triggering by the person, automatic triggering by the device upon passing of a predetermined amount of time after the first input has been received, and monitoring of the person by the device via a secondary device;

if the person is authorized to use the first level of functionality based on the first analysis, then perform a second analysis of the second input to determine whether the person is authorized to use the second level of functionality based on the second analysis; and comparing the first input with the second input to determine whether a change has occurred in an expected manner, and wherein the person has passed a verification procedure if the change has occurred in the expected manner, and wherein the person has failed the verification procedure if the change has not occurred in the expected manner, wherein the verification procedure is associated with authorization of the person, wherein the verification procedure to determine whether the first and second inputs are coming from a living person or a non-living thing including one or more of an audio recording, a video recording, an audio/video recording, and a still picture.

2. The apparatus of claim 1, wherein the person is to be authorized to use both the first and second levels of functionality only if both the first and second analyses indicate the person is so authorized, wherein the change relates to an amount of change in a measured feature including one or more body parts of the person, and wherein the expected manner includes a desired amount of change to the measured feature, and wherein the change includes a voluntary change or an involuntary change, wherein the voluntary change is triggered by the person upon prompting the person, and wherein the involuntary change is detected in response to the person's biometric response.

3. The apparatus of claim 2, wherein the first analysis indicates the person is authorized to use the first level of functionality and wherein the second analysis indicates the person is authorized to use the second level of functionality.

4. The apparatus of claim 1, wherein:

the person is to be granted access to a first level of functionality in the device if the first analysis indicates the person is to be granted access; and the person is to be granted access to a second level of functionality in the device if the second analysis indicates the person is to be granted access;

wherein the second level of features includes the first level of features.

5. The apparatus of claim 1, wherein:

the first and second inputs are both inputs of biometric measurements; and the second analysis includes a more detailed analysis than the first analysis.

6. A method comprising:

performing operations in an electronic device, the operations comprising:

receiving a first input of a first type;

performing a first analysis of the first input to determine if the person attempting to use the device is authorized to use the device based on the first analysis;

receiving a second input of a second type different than the first type, wherein the second input is initiated via at least one of manual triggering by the person, automatic triggering by the device after upon passing of a predetermined amount of time after the first input has been received, and monitoring of the person by the device via a secondary device;

if the person is authorized to use the device based on the first analysis, then performing a second analysis of the second input to verify whether the person is authorized to use the device based on the second analysis; and comparing the first input with the second input to determine whether a change has occurred in an expected manner, and wherein the person has passed a verification procedure if the change has occurred in the expected manner, and wherein the person has failed the verification procedure if the change has not occurred in the expected manner, wherein the verification procedure is associated with authorization of the person, wherein the verification procedure to determine whether the first and second inputs are coming from a living person or a non-living thing including one or more of an audio recording, a video recording, an audio/video recording, and a still picture.

7. The method of claim 6, wherein the operations further comprise granting the person access to the device only if both the first and second analyses indicate the person is authorized to access the device, wherein the change relates to an amount of change in a measured feature including one or more body parts of the person wherein the expected manner includes a desired amount of change to the measured feature, and wherein the change includes a voluntary change or an involuntary change, wherein the voluntary change is triggered by the person upon prompting the person, and wherein the involuntary change is detected in response to the person's biometric response.

8. The method of claim 7, wherein the first analysis indicates the person is authorized to use the first level of functionality and wherein the second analysis indicates the person is authorized to use the second level of functionality.

9. The method of claim 6, wherein the operations further comprise:

granting the person access to a first level of functionality in the device if the first analysis indicates the person is to be granted access; and granting the person access to a second level of functionality in the device if the second analysis indicates the person is to be granted access;

wherein the second level of functionality includes the first level of functionality.

10. The method of claim 6, wherein:

the first and second inputs are both inputs of biometric measurements; and the second analysis includes a more detailed analysis than the first analysis.

11. At least one non-transitory machine-readable medium comprising instructions which, when executed by one or more processors, cause the one or more processors to perform operations comprising:

receiving a first input of a first type;

performing a first analysis of the first input to determine if the person attempting to use the device is authorized to use the device based on the first analysis;

receiving a second input of a second type different than the first type, wherein the second input is initiated via at least one of manual triggering by the person, automatic triggering by the device after upon passing of a predetermined amount of time after the first input has been received, and monitoring of the person by the device via a secondary device;

if the person is authorized to use the device based on the first analysis, then performing a second analysis of the second input to verify whether the person is authorized to use the device based on the second analysis; and comparing the first input with the second input to determine whether a change has occurred in an expected manner, and wherein the person has passed a verification procedure if the change has occurred in the expected manner, and wherein the person has failed the verification procedure if the change has not occurred in the expected manner, wherein the verification procedure is associated with authorization of the person, wherein the verification procedure to determine whether the first and second inputs are coming from a living person or a non-living thing including one or more of an audio recording, a video recording, an audio/video recording, and a still picture.

12. The non-transitory machine-readable medium of claim 11, wherein the operations further comprise granting the person access to the device only if both the first and second analyses indicate the person is authorized to access the device, wherein the change relates to an amount of change in a measured feature including one or more body parts of the person, and wherein the expected manner includes a desired amount of change to the measured feature, and wherein the change includes a voluntary change or an involuntary change, wherein the voluntary change is triggered by the person upon prompting the person, and wherein the involuntary change is detected in response to the person's biometric response.

13. The non-transitory machine-readable medium of claim 11, wherein the operations further comprise:

granting the person access to a first level of functionality in the device if the first analysis indicates the person is to be granted access; and granting the person access to a second level of functionality in the device if the second analysis indicates the person is to be granted access;

wherein the second level of functionality includes the first level of functionality.

14. The non-transitory machine-readable medium of claim 11, wherein:

the first and second inputs are both inputs of biometric measurements; and the second analysis includes a more detailed analysis than the first analysis.

15. The non-transitory machine-readable medium of claim 12, wherein the first analysis indicates the person is authorized to use the first level of functionality and wherein the second analysis indicates the person is authorized to use the second level of functionality.

* * * * *

UNITED STATES PATENT AND TRADEMARK OFFICE
CERTIFICATE OF CORRECTION

PATENT NO.         : 8,943,581 B2                                Page 1 of 1
APPLICATION NO.    : 13/539916
DATED              : January 27, 2015
INVENTOR(S)        : Bran Ferren It is certified that error appears in the above-identified patent and that said Letters Patent is hereby corrected as shown below:

Claims

Column 10:
Line 66, claim 1, "the a first level" should be --a first level--;

Column 11:
Line 11, claim 1, "use the second" should be --use a second--;

Column 11:
Line 44, claim 4, "to a first" should be --to the first--;

Column 11:
Line 47, claim 4, "to a second" should be --to the second--;

Column 12:
Line 59, claim 11, "use the device" should be --use a device--.

Signed and Sealed this
Fifteenth Day of March, 2016

Michelle K. Lee
*Director of the United States Patent and Trademark Office*